United States Patent
Zhang et al.

(10) Patent No.: US 12,423,273 B2
(45) Date of Patent: Sep. 23, 2025

(54) INFORMATION RECOMMENDATION METHOD, APPARATUS, DEVICE, AND MEDIUM BASED ON EMBEDDING TABLE COMPRESSION

(71) Applicant: ZHEJIANG LAB, Hangzhou (CN)

(72) Inventors: Junyang Zhang, Hangzhou (CN); Ruonan Zheng, Hangzhou (CN); Zhaoxiang Wang, Hangzhou (CN); Zhichao Wang, Hangzhou (CN); Chen Wang, Hangzhou (CN); Yu Zhang, Hangzhou (CN); Tianzi Jiang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/595,474

(22) Filed: Mar. 5, 2024

(65) Prior Publication Data

US 2025/0013615 A1 Jan. 9, 2025

Related U.S. Application Data

(63) Continuation of application No. PCT/CN2023/128561, filed on Oct. 31, 2023.

(30) Foreign Application Priority Data

Jul. 3, 2023 (CN) .......................... 202310805640.9

(51) Int. Cl.
*G06F 16/21* (2019.01)
(52) U.S. Cl.
CPC .................................. *G06F 16/21* (2019.01)
(58) Field of Classification Search
CPC .... G06F 16/21; G06F 16/9535; G06F 16/951; G06F 40/194; G06F 40/242; G06Q 30/0631; Y02D 10/00
See application file for complete search history.

(56) References Cited

U.S. PATENT DOCUMENTS

2011/0238943 A1\* 9/2011 Devendran ......... G06F 12/1009
   711/170
2017/0371972 A1\* 12/2017 Finlay ................. H03M 7/3088
(Continued)

FOREIGN PATENT DOCUMENTS

CN 109447813 A 3/2019
CN 115760201 A 3/2023
(Continued)

OTHER PUBLICATIONS

International Search Report of PCT/CN2023/128561.

*Primary Examiner* — Huawen A Peng

(57) ABSTRACT

An information recommendation method, an apparatus, a device, and a medium based on embedding table compression are provided. The method includes: determining, based on a preset compression ratio, to-be-compressed features and non-compressed features in a to-be-compressed embedding table of a recommendation model, generating a similarity index matrix based on a similarity between the to-be-compressed features and the uncompressed features; generating an index dictionary based on the similarity index matrix; substituting a first feature mapping dictionary based on the index dictionary to generate a second feature mapping dictionary, wherein the first feature mapping dictionary is generated based on a data set; and acquiring to-be-recommended data, replacing features in the to-be-recommended data according to the second feature mapping dictionary, inputting replaced features into the recommendation model, and outputting a prediction result.

17 Claims, 6 Drawing Sheets

(56) References Cited

U.S. PATENT DOCUMENTS

2018/0032261 A1* 2/2018 Singhai ................ G06F 12/023
2022/0066647 A1* 3/2022 Krasner ............. H03M 7/6088
2022/0114644 A1   4/2022 Jha et al.

FOREIGN PATENT DOCUMENTS

CN    116522003 A    8/2023
WO   WO2021051515 A1   3/2021

\* cited by examiner

| model | storage space before compression (MB) | storage space after compression (MB) | compression ratio | model accuracy | sample size | inference speed (S) of CPU |
|---|---|---|---|---|---|---|
| original model | 2160 | 2160 | 1 | 78.88 | 100 | 0.005399 |
| compressed model with a combination method | 2160 | 1033 | 2.09 | 78.82 | 100 | 0.010837 |
| compressed model with a quotient method | 2160 | 689 | 3.13 | 77.76 | 100 | 0.00615 |
| original model | 2160 | 2160 | 1 | 78.88 | 50K | 0.5174 |
| | | | | | 100K | 0.9616 |
| | | | | | 200K | 1.8436 |
| compressed model in the present disclosure | 2160 | 19.67 | 109.81 | 78.875 | 50K | 0.4188 |
| | | | | | 100K | 0.8192 |
| | | | | | 200K | 1.6779 |

INFORMATION RECOMMENDATION METHOD, APPARATUS, DEVICE, AND MEDIUM BASED ON EMBEDDING TABLE COMPRESSION

CROSS-REFERENCE TO RELATED APPLICATIONS

This application is a continuation of international patent application No. PCT/CN2023/128561, filed on Oct. 31, 2023, which claims priority to Chinese patent applications No. 202310805640.9, filed on Jul. 3, 2023, titled "INFORMATION RECOMMENDATION METHOD, APPARATUS, DEVICE, AND MEDIUM BASED ON EMBEDDING TABLE COMPRESSION". The contents of the above applications are hereby incorporated by reference.

TECHNICAL FIELD

The present disclosure generally relates to the field of machine learning, and in particular, to an information recommendation method, an apparatus, a device, and a medium based on embedding table compression.

BACKGROUND

A recommendation system as a kind of technical means that can find information of interest for a user from a huge amount of information has become an essential and important tool in the Internet.

With an explosive growth of the user scale of all kinds of websites and a rapid increase in types of items provided by suppliers, a storage pressure of the recommendation system is also increasing, it has become an urgent problem that how to reduce the storage pressure of the recommendation system.

Facing how to reduce the storage pressure of the recommendation model, model compression is a common way. Relevant model compression methods can be roughly divided into compression of an embedding layer of the model, and design and coding of lightweight model structure. Compression of the embedding layer of the model includes low-rank decomposition, quantization, pruning distillation, and the like. In the relevant methods for compression of the embedding layer of the model, a function used in the compression process is usually restricted, and it is necessary to repeatedly carry out cyclic arithmetic, which leads to a decrease in a running speed and model accuracy of a compressed recommendation model.

For the issue that how to improve compression efficiency of the model under a premise of guaranteeing the model accuracy of the recommendation model, no effective solution has been proposed.

SUMMARY

According to various embodiments of the present disclosure, an information recommendation method, an apparatus, a computer device, and a storage medium based on embedding table compression are provided.

In a first aspect, an information recommendation method based on embedding table compression is provided in the present disclosure, including:
  determining, based on a preset compression ratio, to-be-compressed features and uncompressed features in a to-be-compressed embedding table of a recommendation model;
  generating a similarity index matrix based on a similarity between the to-be-compressed features and the uncompressed features;
  generating an index dictionary based on the similarity index matrix;
  substituting a first feature mapping dictionary based on the index dictionary to generate a second feature mapping dictionary, wherein the first feature mapping dictionary is generated based on a data set; and
  acquiring to-be-recommended data, replacing features in the to-be-recommended data according to the second feature mapping dictionary, inputting replaced features into the recommendation model, and outputting a prediction result.

In an embodiment, the generating the similarity index matrix based on the similarity between the to-be-compressed features and the uncompressed features further comprises:
  generating a similarity matrix based on the similarity between the to-be-compressed features and the uncompressed features;
  determining an ordering of matrix element values of each row in the similarity matrix; and
  generating the similarity index matrix based on the ordering of matrix element values.

In an embodiment, the generating the similarity matrix based on the similarity between the to-be-compressed features and the uncompressed features further comprises:
  acquiring first eigenvectors of the to-be-compressed features, second eigenvectors of the uncompressed features; and
  acquiring vector distances between the first eigenvectors and the second eigenvectors, determining similarities between the to-be-compressed features and the uncompressed features based on the vector distances, and generating the similarity matrix.

In an embodiment, after generating the second feature mapping dictionary, the method further comprises:
  updating the recommendation model based on the second feature mapping dictionary, and acquiring a current model accuracy of the recommendation model;
  acquiring an initial model accuracy of the recommendation model, determining a change value of model accuracy of the recommendation model according to the initial model accuracy of the recommendation model and the current model accuracy of the recommendation model; and
  determining whether the change value of model accuracy of the recommendation model is not greater than a preset drop threshold of model accuracy of the recommendation model, if yes, saving the second feature mapping dictionary.

In an embodiment, when the change value of model accuracy is greater than the preset drop threshold of model accuracy, changing a compression ratio and reacquiring the second feature mapping dictionary until the change value of model accuracy of the recommendation model is not greater than the preset drop threshold of model accuracy of the recommendation model.

In an embodiment, the first feature mapping dictionary is generated based on a data set by:
  acquiring the data set and counting attribute feature data of goods in the data set; and
  masking the attribute feature data in the data set to generate the first feature mapping dictionary.

In an embodiment, after generating the first feature mapping dictionary, the method further comprises:

determining a type of the recommendation model, dividing the data set after masking to obtain a training set, a validation set, and a test set; and training the recommendation model based on the training set and the validation set, and acquiring an initial model accuracy of the recommendation model based on the test set after the training is completed.

In a second aspect, an information recommendation apparatus based on embedding table compression is further provided in the present disclosure, including an acquiring module, a compression module, an index module, and a prediction module;

the acquiring module is configured for determining to-be-compressed features and uncompressed features in a to-be-compressed embedding table of a recommendation model based on a preset compression ratio;

the compression module is configured for generating a similarity index matrix based on a similarity between the to-be-compressed features and the uncompressed features, and generating an index dictionary based on the similarity index matrix;

the index module is configured for substituting a first feature mapping dictionary based on the index dictionary to generate a second feature mapping dictionary, wherein the first feature mapping dictionary is generated based on a data set; and the prediction module is configured for acquiring to-be-recommended data, replacing features in the to-be-recommended data according to the second feature mapping dictionary, inputting replaced features into the recommendation model, and outputting a prediction result.

In a third aspect, a computer device is further provided in the present disclosure, including a memory and a processor. A computer program is stored on the memory. The processor is configured to execute the computer program to perform following steps:

determining, based on a preset compression ratio, to-be-compressed features and uncompressed features in a to-be-compressed embedding table of a recommendation model;

generating a similarity index matrix based on a similarity between the to-be-compressed features and the uncompressed features;

generating an index dictionary based on the similarity index matrix;

substituting a first feature mapping dictionary based on the index dictionary to generate a second feature mapping dictionary, wherein the first feature mapping dictionary is generated based on a data set; and acquiring to-be-recommended data, replacing features in the to-be-recommended data according to the second feature mapping dictionary, inputting replaced features into the recommendation model, and outputting a prediction result.

In a fourth aspect, a computer-readable storage medium is further provided in the present disclosure, storing a computer program. The computer program is executed by a processor to implement following steps:

determining, based on a preset compression ratio, to-be-compressed features and uncompressed features in a to-be-compressed embedding table of a recommendation model;

generating a similarity index matrix based on a similarity between the to-be-compressed features and the uncompressed features;

generating an index dictionary based on the similarity index matrix;

substituting a first feature mapping dictionary based on the index dictionary to generate a second feature mapping dictionary, wherein the first feature mapping dictionary is generated based on a data set; and acquiring to-be-recommended data, replacing features in the to-be-recommended data according to the second feature mapping dictionary, inputting replaced features into the recommendation model, and outputting a prediction result.

Details of one or more embodiments of the present disclosure are set forth in the following accompanying drawings and descriptions. Other features, objectives, and advantages of the present disclosure become obvious with reference to the specification, the accompanying drawings, and the claims.

BRIEF DESCRIPTION OF THE DRAWINGS

In order to more clearly illustrate the technical solutions in the embodiments of the present application or the related technology, the accompanying drawings to be used in the description of the embodiments or the related technology will be briefly introduced below, and it will be obvious that the accompanying drawings in the following description are only some of the embodiments of the present application, and that, for one skilled in the art, other accompanying drawings can be obtained based on these accompanying drawings without putting in creative labor.

DETAILED DESCRIPTION OF THE EMBODIMENT

The technical solutions in the embodiments of the present disclosure will be described clearly and completely in the following in conjunction with the accompanying drawings in the embodiments of the present disclosure, and it is obvious that the described embodiments are only a part of the embodiments of the present disclosure, but not all of the embodiments. Based on the embodiments in the present disclosure, all other embodiments obtained by one skilled in the art without making creative labor fall within the scope of protection of the present disclosure.

A recommendation model may contain many tables, each of which may contain embedding vectors with 16 to 300 dimensions, a size of the embedding vectors may reach 10 terabytes, and about 99% or more of a memory is configured to store embedding tables. In addition, the embedding tables may also be important in large models such as Natural Language Processing (NLP) and graph representation learning, so it is necessary to explore compression methods that can efficiently compress the embedding tables without degrading recommendation accuracy of the models.

Figure 1:
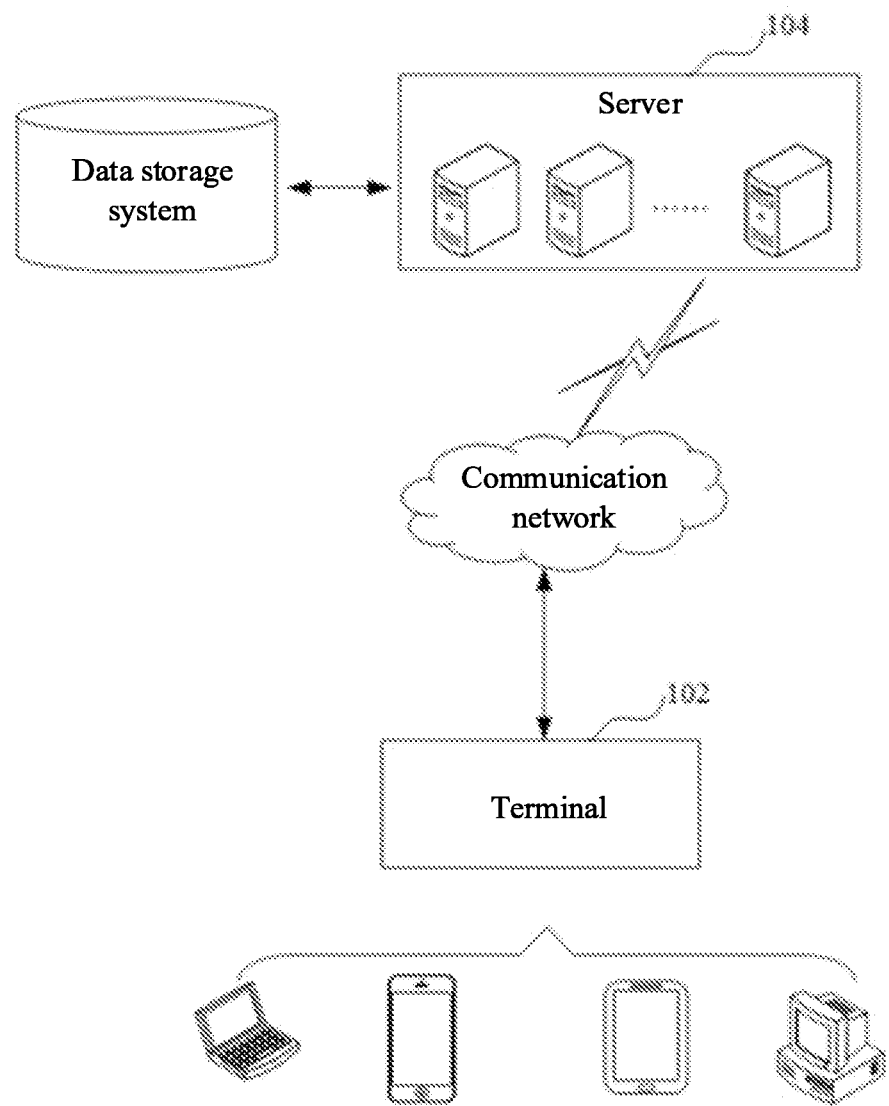
FIG. 1 is a schematic diagram of an application environment of an information recommendation method based on embedding table compression in an embodiment.

An information recommendation method based on embedding table compression is provided in an embodiment of the present disclosure, which may be applied in an application environment as shown in FIG. 1. A terminal 102 may be in communication with a server 104 over a network. A data storage system may store data to be processed by the server 104. The data storage system may be integrated on the server 104, or may be placed on a cloud or other network server. Specifically, after acquiring a data set uploaded by the terminal 102, the server 104 may determine, based on a preset compression ratio, to-be-compressed features and uncompressed features in a to-be-compressed embedding table of a recommendation model; generate a similarity index matrix based on a similarity between the to-be-compressed features and the uncompressed features; generate an index dictionary based on the similarity index matrix; substitute a first feature mapping dictionary based on the index dictionary to generate a second feature mapping dictionary; and acquire to-be-recommended data, replace features in the to-be-recommended data according to the second feature mapping dictionary, input replaced features into the recommendation model, and output a prediction result. The first feature mapping dictionary is generated based on the data set. The terminal 102 may be, but is not limited to, a variety of personal computers, laptops, smartphones, tablets, and the like. The server 104 may be realized with a standalone server or a server cluster including a plurality of servers.

Figure 2:
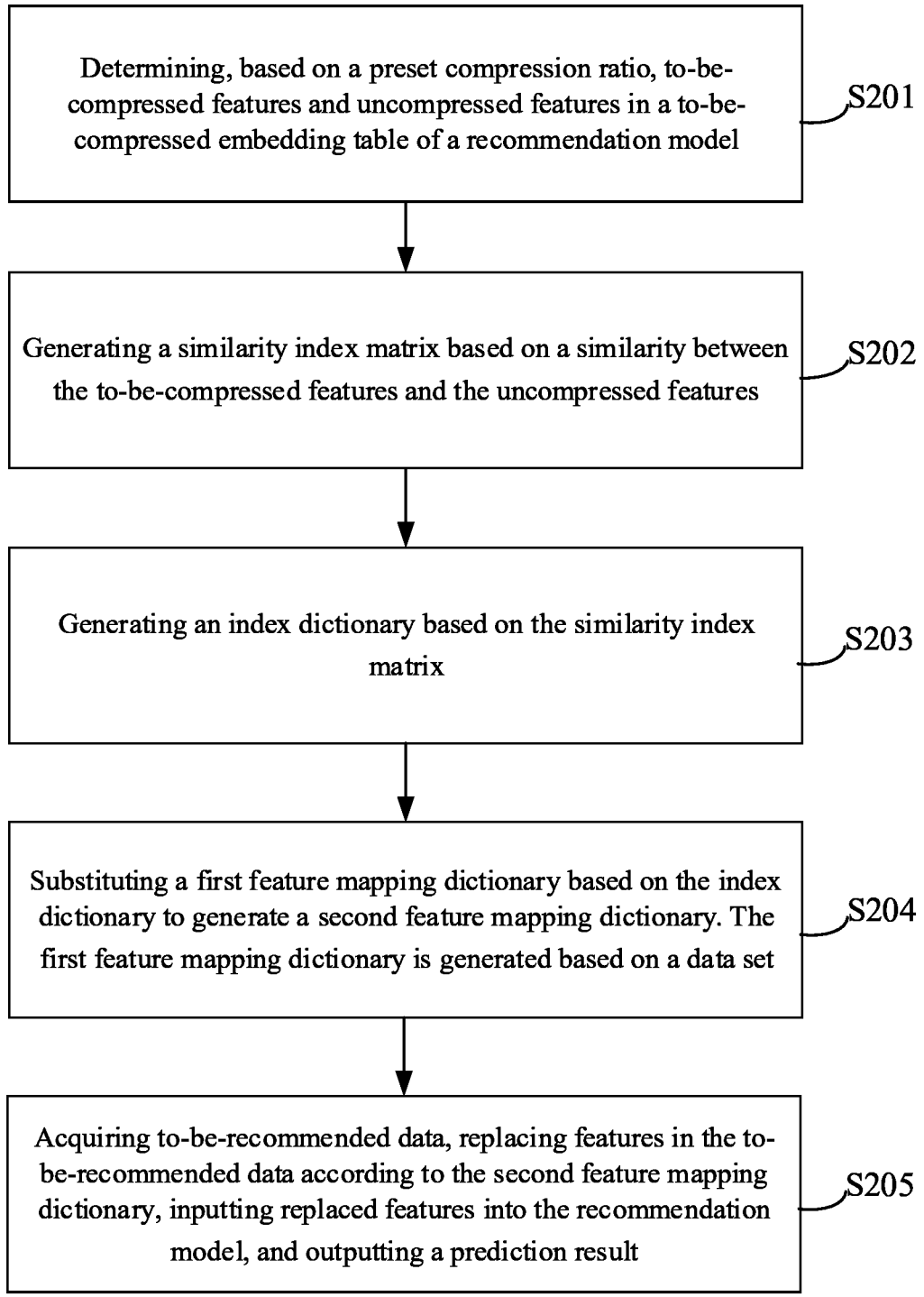
FIG. 2 is a flowchart of an information recommendation method based on embedding table compression in an embodiment.

FIG. 2 is a flowchart of an information recommendation method based on embedding table compression in an embodiment. Referring to FIG. 2, the information recommendation method based on embedding table compression includes following step 201 to step 205.

Step 201 includes determining, based on a preset compression ratio, to-be-compressed features and uncompressed features in a to-be-compressed embedding table of a recommendation model.

The preset compression ratio may be a percentage data preset by a professional, and not fixed and further adjusted according to the accuracy of the recommendation model. Furthermore, the preset compression ratio may be configured to determine a demarcation position between the to-be-compressed features and the uncompressed features in corresponding to-be-compressed embedding table, and thus determine the to-be-compressed features and the uncompressed features in the to-be-compressed embedding table.

The to-be-compressed embedding table may be a data table stored in an embedding layer of the recommendation model. Specifically, a corresponding to-be-compressed embedding table may be established for each attribute of a commodity or each behavioral attribute of the user. For example, for a color, a price, a shape, an origin, or other attributes of the commodity, a corresponding to-be-compressed embedding table may be established as a color embedding table, a price embedding table, a shape embedding table, or an origin embedding table. It is assumed that the color embedding table includes 5 rows of data, each row of data may represent a color feature category, the number of rows of the color embedding table may be the number of color feature categories, and columns of the color embedding table may represent a vector dimension of the embedding table denoted as T_N. In general, the vector dimension T_N of the embedding table may be a power of 2 such as 8, 16, 32, 64, and so on.

In an alternative exemplary embodiment, when a current preset compression ratio is 40%, for a 5-row to-be-compressed embedding table, first 2 rows of the table may belong to the uncompressed features, and the last 3 rows of the table may belong to the to-be-compressed features.

Alternatively, in the embodiment of the present disclosure, it is also necessary to acquire a category threshold of the to-be-compressed embedding table. When the number of categories of the to-be-compressed embedding table is not greater than the category threshold, the to-be-compressed embedding table does not need to be compressed. Exemplarily, when 3 color feature categories exist in the color embedding table, and the category threshold of the color embedding table is exactly 3, the color embedding table does not need to be compressed at this time.

Step 202 includes generating a similarity index matrix based on a similarity between the to-be-compressed features and the uncompressed features.

In an embodiment, the generating the similarity index matrix based on the similarity between the to-be-compressed features and the uncompressed features may further include: generating a similarity matrix based on the similarity between the to-be-compressed features and the uncompressed features; determining an ordering of matrix element values of each row in the similarity matrix; and generating the similarity index matrix based on the ordering of matrix element values.

In an embodiment, the generating the similarity matrix based on the similarity between the to-be-compressed features and the uncompressed features may further include: acquiring first eigenvectors of the to-be-compressed features, second eigenvectors of the uncompressed features; and acquiring vector distances between the first eigenvectors and the second eigenvectors, determining similarities between the to-be-compressed features and the uncompressed features based on the vector distances, and generating the similarity matrix.

Exemplarily, it is assumed that the color embedding table in the current recommendation model has 8 vector dimensions, and values in each dimension may be shown in Table 1.

TABLE 1

| index number | dim0 | dim1 | dim2 | dim3 | dim4 | dim5 | dim6 | dim7 |
|---|---|---|---|---|---|---|---|---|
| 0 | 0.000101 | 0.000102 | 0.000103 | 0.000104 | 0.000105 | 0.000106 | 0.000107 | 0.000108 |
| 1 | 0.000201 | 0.000202 | 0.000203 | 0.000204 | 0.000205 | 0.000206 | 0.000207 | 0.000208 |
| 2 | 0.000301 | 0.000302 | 0.000303 | 0.000304 | 0.000305 | 0.000306 | 0.000307 | 0.000308 |
| 3 | 0.000401 | 0.000402 | 0.000403 | 0.000404 | 0.000405 | 0.000406 | 0.000407 | 0.000408 |
| 4 | 0.000501 | 0.000502 | 0.000503 | 0.000504 | 0.000505 | 0.000506 | 0.000507 | 0.000508 |

In the color embedding table, there are a total of five feature categories with index numbers 0 to 4, and a current compression ratio may be 40%, then it may be determined that first two rows in each compression embedding table represent uncompressed features (first feature vectors), and the last three rows represent to-be-compressed features (second feature vectors). The index numbers may be numbers used to characterize corresponding feature categories after masking an original dataset. A corresponding color similarity matrix may be a 3×2 matrix, each row of the matrix may represent a to-be-compressed feature, each column of the matrix may represent an uncompressed feature, and each matrix element may be a similarity between a to-be-compressed feature and an uncompressed feature.

According to the Table 1, vector distances between the first feature vectors and the second feature vectors may be acquired by calculating a cosine distance. Specifically, the cosine distance may be calculated by a formula:

$$\text{similarity} = \cos(\theta) = \frac{A \cdot B}{\|A\| \, \|B\|} = \frac{\sum_{i=1}^{n} A_i B_i}{\sqrt{\sum_{i=1}^{n} A_i^2} \, \sqrt{\sum_{i=1}^{n} B_i^2}}$$

In the above formula, A represents the first feature vectors corresponding to the uncompressed features, B represents the second feature vectors corresponding to the to-be-compressed features, $A_i$ represents a value of the first feature vectors in an i-th vector dimension, $B_i$ represents a value of the second feature vectors in the i-th vector dimension, and n represents a total number of the vector dimensions of the to-be-compressed embedding table.

Furthermore, the above vector distances may represent the similarities between two vectors, and thus, similarities between the to-be-compressed features and the uncompressed features may be determined based on vector distances to generate a similarity matrix. A first part of a corresponding Table 2 may show a color similarity matrix generated based on the similarities. Similarly, for the price embedding table, the shape embedding table, or the origin embedding table in the recommendation model, the similarities between the to-be-compressed features and the uncompressed features may also be calculated by the cosine distance formula to generate a price similarity matrix, a shape similarity matrix, and an origin similarity matrix correspondingly. Results of four segments may be shown in Table 2.

Alternatively, in other embodiments, similarities between the compressed feature and the respective uncompressed feature may also be determined based on a metric such as Euclidean distance, Manhattan distance, etc.

In the present embodiment, the vector distances between the to-be-compressed features and the uncompressed features may be determined to determine corresponding similarities, so as to determine a relationship between the to-be-compressed features and the uncompressed features based on the similarities, and provide a data basis for subsequent compression of the embedding table based on the relationship between respective features.

Furthermore, after obtaining the similarity matrix, an ordering of matrix element values of each row in the similarity matrix may be determined, and the most similar uncompressed feature of the to-be-compressed features may be determined according to the ordering of the matrix element values. Referring to the Table 2, the similarities between the to-be-compressed feature with an index number 2 and the uncompressed features with an index number 0 and an index number 1 have been obtained according to the cosine distance, respectively, the similarity between the to-be-compressed feature with the index number 2 and the uncompressed feature with index number 0 has been obtained to be 0.8, the similarity between the to-be-compressed feature with the index number 1 and the uncompressed feature with the index number 0 has been obtained to be 0.9, and the two similarities obtained may be sorted. According to a property of the cosine distance, the greater the cosine distance, the greater the similarity between the two vectors, it is determined that the uncompressed feature with the index number 1 is the most similar uncompressed feature to the to-be-compressed feature with the index number 2. Therefore, when determining a color similarity index matrix, a first row of the color similarity index matrix may be determined as (1, 0), 1 represents the index number corresponding to the most similar uncompressed feature to the to-be-compressed feature, and 0 represents the index number corresponding to a second more similar uncompressed feature to the to-be-compressed feature. Similarly, for the to-be-compressed features with index numbers 3 and 4, the color similarity index matrix that can be determined according to similarity matrices may be shown in Table 3. Similarly, based on the price similarity matrix, the shape similarity matrix, and the origin similarity matrix in the Table 2, corresponding obtained price similarity index matrix, shape similarity index matrix, and origin similarity index matrix may also be shown in the Table 3. In the similarity index matrix, each row of the matrix represents the to-be-compressed feature, each column of the matrix represents the uncompressed feature, the matrix element represents whether the to-be-compressed feature is similar to the uncompressed feature or not, 1 represents similarity, and 0 represents dissimilarity.

TABLE 2

| color similarity matrix | | | price similarity matrix | | | shape similarity matrix | | | origin similarity matrix | | |
|---|---|---|---|---|---|---|---|---|---|---|---|
| index number | 0 | 1 | index number | 0 | 1 | index number | 0 | 1 | index number | 0 | 1 |
| 2 | 0.8 | 0.9 | 2 | 0.7 | 0.9 | 2 | 0.9 | 0.6 | 2 | 0.8 | 0.9 |
| 3 | 0.9 | 0.8 | 3 | 0.8 | 0.9 | 3 | 0.9 | 0.8 | 3 | 0.8 | 0.9 |
| 4 | 0.8 | 0.6 | 4 | 0.8 | 0.9 | 4 | 0.6 | 0.8 | 4 | 0.8 | 0.6 |

TABLE 3

| color similarity index matrix | | | price similarity index matrix | | | shape similarity index matrix | | | origin similarity index matrix | | |
|---|---|---|---|---|---|---|---|---|---|---|---|
| index number | 0 | 1 | index number | 0 | 1 | index number | 0 | 1 | index number | 0 | 1 |
| 2 | 1 | 0 | 2 | 1 | 0 | 2 | 0 | 1 | 2 | 1 | 0 |
| 3 | 0 | 1 | 3 | 1 | 0 | 3 | 0 | 1 | 3 | 1 | 0 |
| 4 | 0 | 1 | 4 | 1 | 0 | 4 | 1 | 0 | 4 | 0 | 1 |

In the present embodiment, the similarity index matrix corresponding to each feature may be determined by the similarity between the to-be-compressed features and the uncompressed features, which may enable an index mapping relationship between the to-be-compressed features and the uncompressed features to be determined quickly with help of the similarities between the to-be-compressed features and the uncompressed features, provide data support for the subsequent compression of the embedding table, and thus realize rapid compression of the to-be-compressed embedding table.

Step 203 includes generating an index dictionary based on the similarity index matrix.

Specifically, an index relationship between the to-be-compressed features and the uncompressed features may be determined based on whether the to-be-compressed features are similar to the uncompressed features in the similarity index matrix, and the index dictionary may be generated based on the index relationship. Specifically, when it is determined that a certain to-be-compressed feature is similar to a certain uncompressed feature, it may be determined that the to-be-compressed feature is index-mappable with the uncompressed feature, and when it is determined that a certain to-be-compressed feature is not similar to a certain uncompressed feature, it is determined that the to-be-compressed feature does not have an index-mapping relationship with the uncompressed feature. Exemplarily, according to the color index matrix shown in the Table 3, it may be determined that the to-be-compressed feature corresponding to the index number 2 is similar to the uncompressed feature corresponding to the index number 0, and is not similar to the uncompressed feature corresponding to the index number 1. It may be determined that the to-be-compressed feature corresponding to the index number 2 has an index mapping relationship with the uncompressed feature corresponding to the index number 0, data of the to-be-compressed feature corresponding to the index number 2 may be determined by the index mapping relationship in a compressed embedding table, without recording data of the to-be-compressed feature corresponding to the index number 2. Similarly, it is known that the to-be-compressed feature with an index number 3 has an index mapping relationship with the uncompressed feature with the index number 1, and the to-be-compressed feature with an index number 4 has an index mapping relationship with the uncompressed feature with the index number 1, corresponding to which the color index dictionary may be obtained as follows: {0ABCDE: 0, A0BCDE: 1, AB0CDE: 1, ABC0DE: 0, ABCD0E: 0}.

Similarly, based on the Table 3, the price index dictionary may be determined as follows: {1ABCDE: 0, A1BCDE: 1, AB1CDE: 1, ABC1DE: 1, ABCD1E: 1}, the shape index dictionary may be determined as follows: {2ABCDE: 0, A2BCDE: 1, AB2CDE: 0, ABC2DE: 0, ABCD2E: 1}, and the origin index dictionary may be determined as follows: {3ABCDE: 0, A3BCDE: 1, AB3CDE: 1, ABC3DE: 1, ABCD3E: 0}.

That is, the index dictionary may be obtained as: the color index dictionary {0ABCDE: 0, A0BCDE: 1, AB0CDE: 1, ABC0DE: 0, ABCD0E: 0}, the price index dictionary {1ABCDE: 0, A1BCDE: 1, AB1CDE: 1, ABC1DE: 1, ABCD1E: 1}, the shape index dictionary {2ABCDE: 0, A2BCDE: 1, AB2CDE: 0, ABC2DE: 0, ABCD2E: 1}, and the origin index dictionary {3ABCDE: 0, A3BCDE: 1, AB3CDE: 1, ABC3DE: 1, ABCD3E: 0}.

Step 204 includes substituting a first feature mapping dictionary based on the index dictionary to generate a second feature mapping dictionary. The first feature mapping dictionary is generated based on a data set.

Specifically, in an embodiment, the first feature mapping dictionary generated based on the data set may include: acquiring the data set and counting attribute feature data of goods in the data set, and masking attribute feature data in the data set to generate the first feature mapping dictionary.

In the embodiment of the present disclosure, it is also necessary to predetermine a recommendation algorithm as well as a corresponding data set before compressing the embedding tables in the recommendation model, because the number and dimensions of the embedding tables of the recommendation model corresponding to recommendation algorithms based on different network models as well as different large-scale data sets are not the same.

In an exemplary embodiment corresponding to the color embedding table, the shape embedding table, the price embedding table, and the origin embedding table, the acquired data set may be shown in Table 4, and a corresponding adopted recommendation model may be a DLRM (Deep Learning Recommendation Model). A label represents a comparison target in a training process of the model, 0 represents no recommendation, and 1 represents recommendation.

The attribute feature data of the goods in the Table 4 shows that there are four attribute features in this exemplary embodiment, which are color, price, shape, and origin. Therefore, the number of embedding tables in the data set is 4, which are the color embedding table, the price embedding table, the shape embedding table, and the origin embedding table.

TABLE 4

| number | color | price | shape | origin | label |
|---|---|---|---|---|---|
| 1 | 0ABCDE | 1ABCDE | 2ABCDE | 3ABCDE | 0 |
| 2 | 0ABCDE | 1ABCDE | 2ABCDE | 3ABCDE | 1 |
| 3 | 0ABCDE | 1ABCDE | 2ABCDE | 3ABCDE | 0 |
| 4 | 0ABCDE | 1ABCDE | 2ABCDE | 3ABCDE | 1 |
| 5 | 0ABCDE | 1ABCDE | 2ABCDE | 3ABCDE | 0 |
| 6 | 0ABCDE | 1ABCDE | 2ABCDE | 3ABCDE | 1 |
| 7 | A0BCDE | A1BCDE | A2BCDE | A3BCDE | 0 |
| 8 | A0BCDE | A1BCDE | A2BCDE | A3BCDE | 1 |
| 9 | A0BCDE | A1BCDE | A2BCDE | A3BCDE | 0 |
| 10 | A0BCDE | A1BCDE | A2BCDE | A3BCDE | 1 |
| 11 | A0BCDE | A1BCDE | A2BCDE | A3BCDE | 0 |
| 12 | AB0CDE | AB1CDE | AB2CDE | AB3CDE | 1 |
| 13 | AB0CDE | AB1CDE | AB2CDE | AB3CDE | 0 |
| 14 | AB0CDE | AB1CDE | AB2CDE | AB3CDE | 1 |
| 15 | AB0CDE | AB1CDE | AB2CDE | AB3CDE | 0 |
| 16 | ABC0DE | ABC1DE | ABC2DE | ABC3DE | 1 |
| 17 | ABC0DE | ABC1DE | ABC2DE | ABC3DE | 0 |
| 18 | ABC0DE | ABC1DE | ABC2DE | ABC3DE | 1 |
| 19 | ABCD0E | ABCD1E | ABCD2E | ABCD3E | 0 |
| 20 | ABCD0E | ABCD1E | ABCD2E | ABCD3E | 1 |

Furthermore, after determining the attribute feature data of the goods, it is also necessary to determine quantity denoted as T_M corresponding to each category contained in each of the embedding tables. According to the Table 2, it is known that for the color embedding table, it may contain 5 feature categories, namely, 0ABCDE, A0BCDE, AB0CDE, ABC0DE, and ABCD0E. The number of the feature category 0ABCDE is 6, the number of the feature category A0BCDE is 5, the number of the feature category AB0CDE is 4, the number of the feature category ABC0DE is 3, and the number of the feature category ABCD0E is 2. Similarly, for the price embedding table, it may contain 5 feature categories, namely, 0ABCDE, A0BCDE, AB0CDE, ABC0DE, and ABCD0E. The number of the feature category 0ABCDE is 6, the number of the feature category A0BCDE is 5, the number of the feature category AB0CDE is 4, the number of the feature category ABC0DE is 3, and the number of the feature category ABCD0E is 2. For the shape embedding table, it may contain 5 feature categories, namely, 0ABCDE, A0BCDE, AB0CDE, ABC0DE, and ABCD0E. The number of the feature category 0ABCDE is 6, the number of the feature category A0BCDE is 5, the number of the feature category AB0CDE is 4, the number of the feature category ABC0DE is 3, and the number of the feature category ABCD0E is 2. For the origin embedding table, it may contain 5 feature categories, namely, 0ABCDE, A0BCDE, AB0CDE, ABC0DE, and ABCD0E. The number of the feature category 0ABCDE is 6, the number of the feature category A0BCDE is 5, the number of the feature category AB0CDE is 4, the number of the feature category ABC0DE is 3, and the number of the feature category ABCD0E is 2.

It should be noted that in practical application scenarios, the number of feature categories T_M is very large, which may reach a level of ten million or billion, and the larger the number of feature categories T_M is, the larger storage requirements thereof are. Generally, the number of feature categories T_M may be determined by the number of certain feature categories of a certain goods in the data set. The number of feature categories shown in the above embodiments is for exemplary illustration and is not specifically limited in the present disclosure.

It should be understood that, in consideration of data privacy issues in practical application scenarios, in general, the attribute features of the user as well as data features of the goods are to be encrypted and masked to generate the first feature mapping dictionary to ensure security of the data. In the present embodiment, the first feature mapping dictionary may be mainly realized by following step 1 and step 2.

Step 1 may include constructing a feature-quantity dictionary denoted as {key, value}. In the feature-quantity dictionary, the key represent a feature category, the value represents a quantity of the feature category, and the key needs to be arranged from largest to smallest according to the value. Based on statistical results of the above data set (the Table 2), it can be seen that in this exemplary embodiment, four feature-quantity dictionaries may be constructed, which are a color dictionary denoted as {0ABCDE: 6, A0BCDE: 5, AB0CDE: 4, ABC0DE: 3, ABCD0E: 2}, a price dictionary denoted as {1ABCDE: 6, ABCDE: 5, AB1CDE: 4, and ABC1DE: 3, ABCD1E: 2}, a shape dictionary denoted as {2ABCDE: 6, A2BCDE: 5, AB2CDE: 4, ABC2DE: 3, ABCD2E: 2}, and an origin dictionary denoted as {3ABCDE: 6, A3BCDE: 5, AB3CDE: 4, ABC3DE: 3, ABCD3E: 2}.

Step 2 may include constructing a first feature mapping dictionary denoted as {key, value} based on the feature-quantity dictionary. The key in the first feature mapping dictionary may be a feature and the value in the first feature mapping dictionary may be an integer. In this step, the value may be determined according to the number of the feature category of the feature-quantity dictionary, starting from 0, and numbered in an increasing order until all features have been encoded, and the first feature mapping dictionary may include: a color feature mapping dictionary denoted as {0ABCDE: 0, A0BCDE: 1, AB0CDE: 2, ABC0DE: 3, ABCD0E: 4}, a price feature mapping dictionary denoted as {1ABCDE: 0, A1BCDE: 1, AB1CDE: 2, ABC1DE: 3, ABCD1E: 4}, a shape feature mapping dictionary denoted as {2ABCDE: 0, A2BCDE: 1, AB2CDE: 2, ABC2DE: 3, ABCD2E: 4}, an origin feature mapping dictionary denoted as {3ABCDE: 0. A3BCDE: 1, AB3CDE: 2, ABC3DE: 3, ABCD3E: 4}. The numbers 0 to 4 may be initial index numbers of respective feature categories in each feature for masking the corresponding feature categories.

Furthermore, a masked data set as shown in Table 5 may be obtained by transforming individual features in the data set based on the first feature mapping dictionary.

In the present embodiment, the data set may be preprocessed, the data in the data set may be masked, and the corresponding first feature mapping dictionary may be constructed, so as to quickly determine to-be-compressed embedding table when compressing the embedding table, and provide a basis for subsequent improvement of compression efficiency of the embedding table.

TABLE 5

| number | color | price | shape | origin | label |
|--------|-------|-------|-------|--------|-------|
| 1  | 0 | 0 | 0 | 0 | 0 |
| 2  | 0 | 0 | 0 | 0 | 1 |
| 3  | 0 | 0 | 0 | 0 | 0 |
| 4  | 0 | 0 | 0 | 0 | 1 |
| 5  | 0 | 0 | 0 | 0 | 0 |
| 6  | 0 | 0 | 0 | 0 | 1 |
| 7  | 1 | 1 | 1 | 1 | 0 |
| 8  | 1 | 1 | 1 | 1 | 1 |
| 9  | 1 | 1 | 1 | 1 | 0 |
| 10 | 1 | 1 | 1 | 1 | 1 |
| 11 | 1 | 1 | 1 | 1 | 0 |
| 12 | 2 | 2 | 2 | 2 | 1 |
| 13 | 2 | 2 | 2 | 2 | 0 |
| 14 | 2 | 2 | 2 | 2 | 1 |
| 15 | 2 | 2 | 2 | 2 | 0 |
| 16 | 3 | 3 | 3 | 3 | 1 |
| 17 | 3 | 3 | 3 | 3 | 0 |
| 18 | 3 | 3 | 3 | 3 | 1 |
| 19 | 4 | 4 | 4 | 4 | 0 |
| 20 | 4 | 4 | 4 | 4 | 1 |

Furthermore, the first feature mapping dictionary may be substituted by the index dictionary. That is, the color feature mapping dictionary {0ABCDE: 0. A0BCDE: 1, AB0CDE: 2, ABC0DE: 3, ABCD0E: 4}, the price feature mapping dictionary {1ABCDE: 0, A1BCDE: 1, AB1CDE: 2, ABC1DE: 3, ABCD1E: 4}, the shape feature mapping dictionary {2ABCDE: 0, A2BCDE: 1, AB2CDE: 2, and ABC2DE: 3, ABCD2E: 4}, and the origin feature mapping dictionary {3ABCDE: 0, A3BCDE: 1, AB3CDE: 2, ABC3DE: 3, ABCD3E: 4} may be substituted by the color index dictionary {0ABCDE: 0, A0BCDE: 1, AB0CDE: 1, ABC0DE: 0, ABCD0E: 0}, the price index dictionary {1ABCDE: 0, A1BCDE: 1, AB1CDE: 1, ABC1DE: 1, ABCD1E: 1}, the shape index dictionary {2ABCDE: 0, A2BCDE: 1, AB2CDE: 0, ABC2DE: 0, ABCD2E: 1}, and the origin-indexed dictionary {3ABCDE: 0, A3BCDE: 1, AB3CDE: 1, ABC3DE: 1, ABCD3E: 0}. A result of the substitution may be: a color feature mapping dictionary denoted as {0ABCDE: 0, A0BCDE: 1, AB0CDE: 1, ABC0DE: 0, ABCD0E: 0}, a price feature mapping dictionary denoted as {1ABCDE: 0, A1BCDE: 1, AB1CDE: 1, ABC1DE: 1, ABCD1E: 1}, a shape feature mapping dictionary denoted as {2ABCDE: 0, A2BCDE: 1, AB2CDE: 0, ABC2DE: 0, ABCD2E: 1}, an origin feature mapping dictionary denoted as {3ABCDE: 0, A3BCDE: 1, AB3CDE: 1, ABC3DE: 1, ABCD3E: 0}.

Step 205 includes acquiring to-be-recommended data, replacing features in the to-be-recommended data according to the second feature mapping dictionary, inputting replaced features into the recommendation model, and outputting a prediction result.

Figure 3:
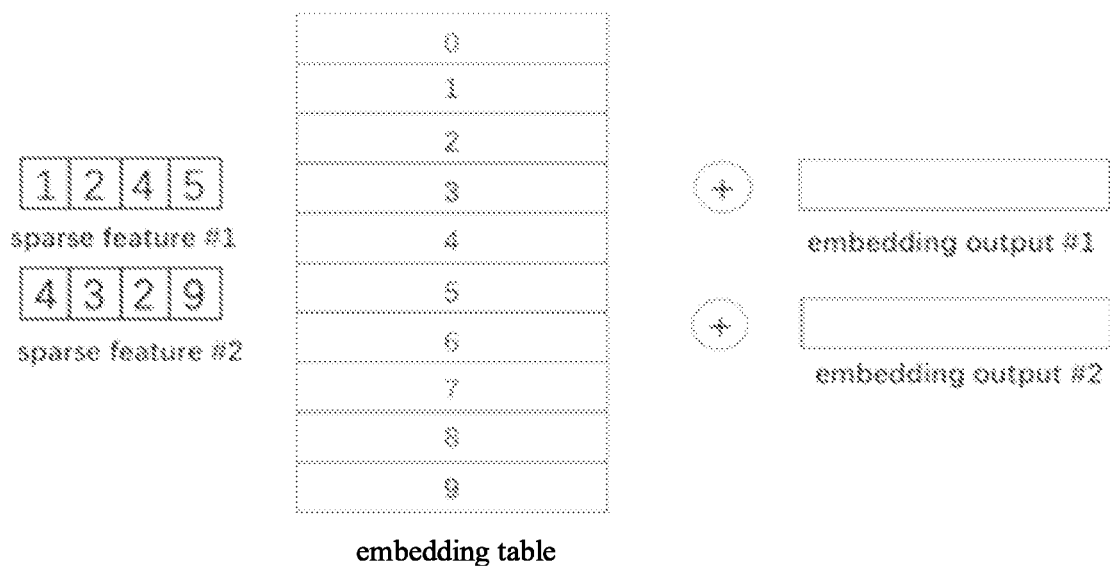
FIG. 3 is a schematic diagram of an embedding table lookup process in the related art.

Exemplarily, FIG. 3 is a schematic diagram of an embedding table lookup process in an embodiment. Referring to FIG. 3, after acquiring the to-be-recommended data, it is determined that the to-be-recommended data has two features (sparse feature #1; sparse feature #2) corresponding to two sets of identifiers (1245; 4329). Values corresponding to each set of feature identifiers may be queried with aid of an Embedding Table, corresponding vector outputs (embedding output #1; embedding output #2) may be generated based on the lookup result, and then a neural network in the recommendation model may determine the corresponding prediction result to output based on the vectors output after the embedding table lookup.

In an embodiment of the present disclosure, when the recommendation model predicts new recommendation data, the vectors in the third row of the embedding table and thereafter do not need to be mapped when the features are mapped, i.e., it is no need to save the matrix in the third row of the embedding table matrix and thereafter in the recommendation model, which then achieves a purpose of model compression.

In the above-described information recommendation method based on embedding table compression, the to-be-compressed features and uncompressed features in the to-be-compressed embedding table of the recommendation model may be determined according to a preset compression ratio, and the similarity index matrix may be generated based on the similarity between the to-be-compressed features and the uncompressed features. Thereby, the index mapping relationship between individual feature categories may be determined by acquiring the similarities between individual feature categories in the embedding table of the recommendation model. Then, the index dictionary may be generated based on the similarity index matrix, the first feature mapping dictionary may be substituted based on the index dictionary to generate the second feature mapping dictionary, the first feature mapping dictionary may be generated based on the data set, thereby realizing the compression of the embedding table in the recommendation model according to the index mapping relationship between individual feature categories described above. Finally, the to-be-recommended data may be acquired, features in the to-be-recommended data may be replaced according to the second feature mapping dictionary, replaced features may be input into the recommendation model, and the prediction result may be output. Therefore, when compressing the recommendation model, the embedding table in the recommendation model may be compressed without affecting the model accuracy of the recommendation model, thereby improving the compression efficiency of the embedding table, substantially reducing storage overhead of the model, and improving inference speed of the model.

In an embodiment, after generating the second feature mapping dictionary, the method may further include: updating the recommendation model based on the second feature mapping dictionary, and acquiring a current model accuracy of the recommendation model, acquiring an initial model accuracy of the recommendation model, determining a change value of model accuracy of the recommendation model according to the initial model accuracy and the current model accuracy; determining whether the change valve of model accuracy is not greater than a preset drop threshold of model accuracy, if yes, saving the second feature mapping dictionary.

It should be understood that after the first feature mapping dictionary is substituted, the embedding table saved in the recommendation model will also change, and the corresponding change in the model accuracy of the recommendation model will also occur. Therefore, in the present embodiment, it is also necessary to test the change value of the model accuracy of the recommendation model to determine the change value of the accuracy of the recommendation model. Specifically, the current model accuracy of the recommendation model may be verified again with aid of a preset test set, and the change value of the model accuracy may be determined by comparing the initial model accuracy and the current model accuracy of the recommendation model. Then, a preset drop threshold of model accuracy denoted as t_v may be acquired. When the change value of the model accuracy is not greater than the preset drop threshold of model accuracy t_v, it means that the current change value of the model accuracy is in an acceptable range of model accuracy drop of the recommendation model, and the second feature mapping dictionary is available, and it can be directly saved for use.

In the present embodiment, it is determined whether the change value of the model accuracy of the recommendation model is in the acceptable range of model accuracy drop of the recommendation model, it is ensured that the model accuracy of the recommendation model is not excessively affected while compressing the embedding table, and thus the model accuracy of the model can be ensured while compressing the embedding table in the recommendation model.

In an embodiment, when the change value of the model accuracy is greater than the preset drop threshold of model accuracy, the compression ratio is changed and the second feature mapping dictionary is reacquired until the change value of the model accuracy of the recommendation model is not greater than the preset drop threshold of model accuracy.

In the present embodiment, in a case that the current change value of model accuracy of the recommendation model exceeds the acceptable range of model accuracy drop of the recommendation model, it is indicated that the current compression ratio is too large or too small, and the compression ratio needs to be readjusted to avoid excessive degradation of the model accuracy of the recommendation model. Exemplarily, the compression ratio may be appropriately reduced, the original to-be-compressed embedding table may be re-compressed to acquire a new second feature mapping dictionary, and then the corresponding change value of model accuracy of the recommendation model may be acquired, and it may be determined whether the new change value of model accuracy is within the acceptable range of model accuracy drop of the recommendation model, if yes, the new second feature mapping dictionary may be saved; if no, it is still necessary to continue adjusting the compression ratio until the change value of model accuracy of the recommendation model corresponding to the compression ratio is in the acceptable range of model accuracy drop.

In the present embodiment, the compression ratio of the to-be-compressed embedding table may be adjusted in time when it is determined that the change value of model accuracy of the recommendation model exceeds the acceptable range of model accuracy drop of the recommendation model, to ensure that the compression efficiency of the model may be improved while the model accuracy of the recommendation model is not overly affected by the compression of the embedding table.

In an embodiment, after generating the first feature mapping dictionary, the method may further include: determining a type of the recommendation model, dividing the data set after masking to obtain a training set, a validation set, and a test set; training the recommendation model based on the training set and the validation set, and acquiring an initial model accuracy of the recommendation model based on the test set after the training is completed.

Common recommendation models may include wide & deep, DLRM, DeepFM (Factorization Machine), etc. In the present embodiment, taking the DLRM as an example, before training the recommendation model, it is also necessary to divide the above masked data set to obtain the training set, the validation set, and the test set. Exemplarily, a division ratio may be set to 8:1:1. Then the recommendation model may be trained by the training set, output results of the recommendation model may be verified with aid of the validation set until the recommendation model converges, i.e., the model accuracy is not improving any more, and finally the initial model accuracy of the recommendation model is verified on the test set.

In the present embodiment, after acquiring the first feature mapping dictionary corresponding to the data set, a pre-training of the recommendation model may be performed, and then the initial model accuracy of the recommendation model may be acquired, so as to facilitate timely detection of the model accuracy drop of the recommendation model subsequently when the recommendation model changes with the compression of the embedding table, and to avoid the compression of the embedding table leading to excessive model accuracy drop of the recommendation model.

Figure 4:
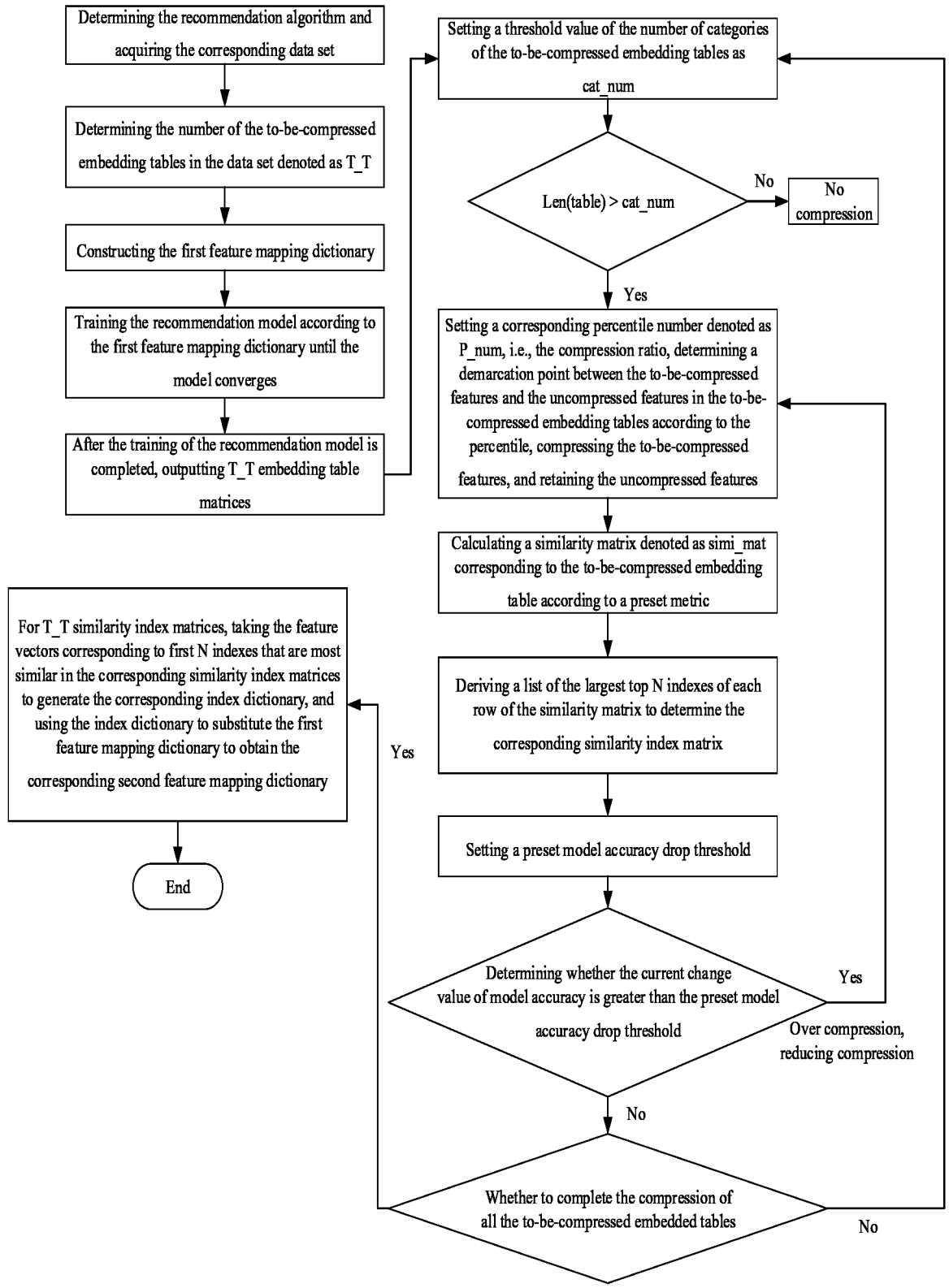
FIG. 4 is a flowchart of an information recommendation method based on embedding table compression in an alternative embodiment.

FIG. 4 is a flowchart of an information recommendation method based on embedding table compression in an alternative embodiment. Referring to FIG. 4, after determining the recommendation algorithm and acquiring the corresponding data set, the number of the to-be-compressed embedding tables in the data set denoted as T_T may be determined, then the data in the to-be-compressed embedding tables may be sorted, and the first feature mapping dictionary may be constructed. Afterwards, the recommendation model may be trained according to the first feature mapping dictionary until the model converges. After the training of the recommendation model is completed, T_T embedding table matrixes corresponding to the to-be-compressed embedding tables may be obtained from the output of the recommendation model, and then a threshold value of the number of categories of the to-be-compressed embedding tables may be set as cat_num. It may be determined whether the number of rows denoted as Len (table) in each of the embedding table matrixes corresponding to the to-be-compressed embedding tables is greater than the threshold value of the number of categories cat_num, if yes, the to-be-compressed embedding tables may be compressed, and a corresponding percentile number denoted as P_num may be set, i.e., the compression ratio. A demarcation point between the to-be-compressed features and the uncompressed features in the to-be-compressed embedding tables may be determined according to the percentile, the to-be-compressed features may be compressed, and the uncompressed features may be retained. Then a metric for calculating the similarities between the to-be-compressed features and the uncompressed features may be determined, and a similarity matrix denoted as simi_mat corresponding to the to-be-compressed embedding table may be calculated according to the metric. The rows in the similarity matrix may represent the rows of the to-be-compressed embedding table, and the columns in the similarity matrix may represent the similarity values between each row of the to-be-compressed embedding table and each row of an uncompressed matrix. Then a list of the largest top N indexes of each row of the similarity matrix may be derived to determine the corresponding similarity index matrix. Then a preset model accuracy drop threshold may be set, it is determined whether the current change value of model accuracy is greater than the preset model accuracy drop threshold, and it is determined to increase the compression ratio or decrease the compression ratio. Specifically, when the current change value of model accuracy is not greater than the preset model accuracy drop threshold, the similarity index matrix may be saved, and compression of the next embedding table may be performed until all the to-be-compressed embedded tables have completed compression, otherwise, the percentile number P_num may be reset and the compression of this to-be-compressed embedding table may be performed again until the change value of model accuracy of the recommendation model is not greater than the preset model accuracy drop threshold. After completing the compression of all the to-be-compressed embedding tables, for T_T similarity index matrices, the feature vectors corresponding to first N indexes that are most similar in the corresponding similarity index matrices may be taken to generate the corresponding index dictionary, and the index dictionary may be used to substitute the first feature mapping dictionary to obtain the corresponding second feature mapping dictionary. Alternatively, when generating the index dictionary, the vectors corresponding to the first N indexes that are most similar may be activated by ReLU (Rectified Linear Unit) and then averaged to obtain new to-be-compressed vectors, and the index dictionary may be generated according to the new to-be-compressed vectors, so as to further improve the accuracy of the model. The model accuracy of the recommendation model may be effectively improved by constructing the index dictionary from activated to-be-compressed vectors and generating the second feature mapping dictionary. The model accuracy of a corresponding compressed recommendation model may exceed the model accuracy of an uncompressed model.

Figures 5, 6:
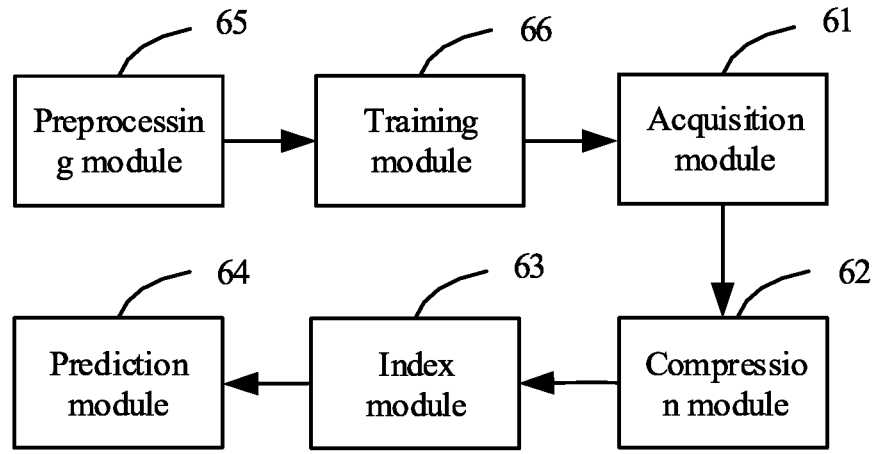
FIG. 5 is a schematic diagram of a comparison of compression effects on a real data set after compression of a recommendation model in an exemplary embodiment.
FIG. 6 is a schematic diagram of a structure of an information recommendation apparatus based on embedding table compression in an embodiment of the present disclosure.

Correspondingly, FIG. 5 is a schematic diagram of a comparison of compression effect of the recommendation model after compression on a real data set in an exemplary embodiment. Referring to FIG. 5, a storage space required for the original model before compression may be 2,160 MB, and the compression ratio may only be controlled within 10 in correlation quotient method and combination method, and the compressed recommendation model may still require a large amount of storage space. In the present disclosure, the compression ratio may be increased to more than 100, and storage overhead of the compressed recommendation model may be significantly reduced.

It should be appreciated that although the steps in the flowcharts of the embodiments described above are shown sequentially as indicated by the arrows, the steps are not necessarily executed sequentially in the order indicated by the arrows. Unless expressly stated herein, there is no strict order limitation on the execution of these steps, and these steps may be executed in other orders. Moreover, at least a portion of the steps in the flowchart involved in the embodiments as described above may include multiple steps or multiple phases, which are not necessarily executed to completion at the same moment but may be executed at different moments, and the order in which these steps or stages are performed is also not necessarily sequential, but may be performed in turn or alternately with other steps or at least a portion of steps or stages in other steps.

Based on the same inventive concept, an information recommendation apparatus based on embedding table compression is provided in the embodiments of the present disclosure, for realizing the information recommendation method based on embedding table compression. The realization of solving the problem provided by the apparatus may be similar to the realization documented in the above-described method, so specific limitations in the one or more embodiments of the information recommendation apparatus based on embedding table compression provided below may be referred to the above-described limitations for the information recommendation method based on embedding table compression, and will not be repeated herein.

FIG. 6 is a schematic diagram of a structure of an information recommendation apparatus based on embedding table compression in an embodiment. The information recommendation apparatus based on embedding table compression includes: an acquisition module 61, a compression module 62, an index module 63, and a prediction module 64.

The acquisition module 61 is configured for determining to-be-compressed features and uncompressed features in a to-be-compressed embedding table of a recommendation model based on a preset compression ratio.

The compression module 62 is configured for generating a similarity index matrix based on a similarity between the to-be-compressed features and the uncompressed features, and generating an index dictionary based on the similarity index matrix.

The index module 63 is configured for substituting a first feature mapping dictionary based on the index dictionary to generate a second feature mapping dictionary, and the first feature mapping dictionary is generated based on a data set.

The prediction module 64 is configured for acquiring to-be-recommended data, replacing features in the to-be-recommended data according to the second feature mapping dictionary, inputting replaced features into the recommendation model, and outputting a prediction result.

In the above information recommendation apparatus based on embedding table compression, the to-be-compressed features and uncompressed features in the to-be-compressed embedding table of the recommendation model may be determined according to a preset compression ratio, and the similarity index matrix may be generated based on the similarity between the to-be-compressed features and the uncompressed features. Thereby, the index mapping relationship between individual feature categories may be determined by acquiring the similarities between individual feature categories in the embedding table of the recommendation model. Then, the index dictionary may be generated based on the similarity index matrix, the first feature mapping dictionary may be substituted based on the index dictionary to generate the second feature mapping dictionary, the first feature mapping dictionary may be generated based on the data set, thereby realizing the compression of the embedding table in the recommendation model according to the index mapping relationship between individual feature categories described above. Finally, the to-be-recommended data may be acquired, features in the to-be-recommended data may be replaced according to the second feature mapping dictionary, replaced features may be input into the recommendation model, and the prediction result may be output. Therefore, when compressing the recommendation model, the embedding table in the recommendation model may be compressed without affecting the model accuracy of the recommendation model, thereby improving the compression efficiency of the embedding table, substantially reducing storage overhead of the model, and improving inference speed of the model.

Furthermore, the compression module 62 is further configured for generate a similarity matrix based on the similarity between the features to be compressed and the uncompressed features; determining an ordering of matrix element values of each row in the similarity matrix; and generating the similarity index matrix based on the matrix element value ordering.

Further, the compression module 62 is further configured for acquiring first eigenvectors of the to-be-compressed features, second eigenvectors of the uncompressed features; and acquiring vector distances between the first eigenvectors and the second eigenvectors, determining similarities between the to-be-compressed features and the uncompressed features based on the vector distances, and generating the similarity matrix.

Furthermore, the index module 63 is further configured for updating the recommendation model based on the second feature mapping dictionary, and acquiring a current model accuracy of the recommendation model; acquiring an initial model accuracy of the recommendation model, determining a change value of model accuracy of the recommendation model according to the initial model accuracy and the current model accuracy; and determining whether the change value of model accuracy is not greater than a preset drop threshold of model accuracy, if yes, saving the second feature mapping dictionary.

Furthermore, the index module 63 is further configured for changing a compression ratio and reacquiring the second feature mapping dictionary until the change value of model accuracy of the recommendation model is not greater than the preset drop threshold of model accuracy when the change value of model accuracy is greater than the preset drop threshold of model accuracy.

Furthermore, the apparatus may further include a preprocessing module 65, which is configured for acquiring the data set and counting attribute feature data of goods in the data set; and masking the attribute feature data in the data set to generate the first feature mapping dictionary.

Furthermore, the apparatus may further include a training module 66, which is configured for determining a type of the recommendation model, dividing the data set after masking to obtain a training set, a validation set, and a test set; and training the recommendation model based on the training set and the validation set, and acquiring an initial model accuracy of the recommendation model based on the test set after the training is completed.

The various modules in the information recommendation apparatus based on embedding table compression may be implemented in whole or in part by software, hardware, and combinations thereof. Each of the above modules may be embedded in or independent of a processor in a computer device in the form of hardware, or may be stored in a memory in the computer device in the form of software so as to be invoked by the processor to perform operations corresponding to each of the above modules.

Figure 7:
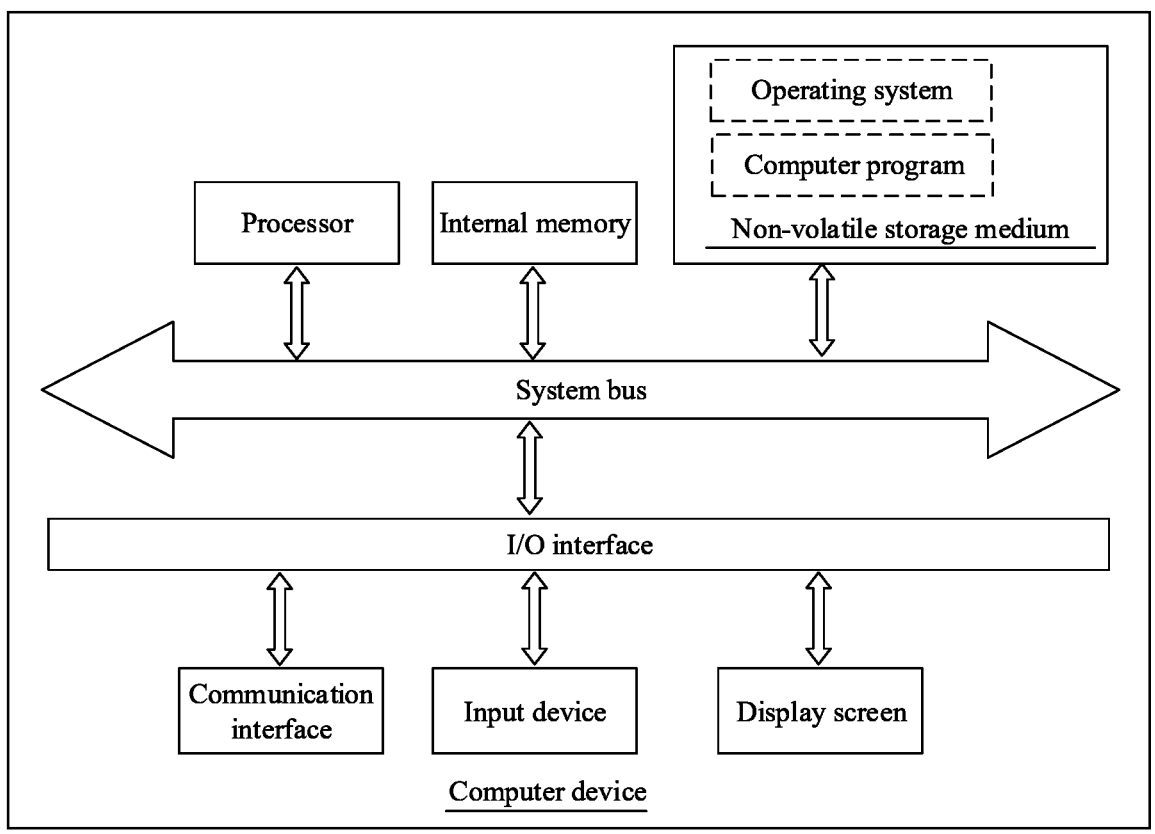
FIG. 7 is a schematic diagram of an internal structure of a computer device in an embodiment.

In an embodiment, a computer device is provided, which may be a terminal, and whose internal structure diagram may be shown in FIG. 7. The computer device may include a processor, a memory, a communication interface, a display, and an input device connected via a system bus. The processor of the computer device is configured to provide computing and control capabilities. The memory of the computer device may include a non-volatile storage medium and an internal memory. The non-volatile storage medium may store an operating system and a computer program. The internal memory may provide an environment for the operation of the operating system and the computer program in the non-volatile storage medium. The communication interface of the computer device is configured to communicate with an external terminal in a wired or wireless manner, and the wireless manner may be realized by WIFI, mobile cellular network, NFC (Near Field Communication) or other technologies. The computer program may be executed by a processor to implement an information recommendation method based on embedding table compression. The display of the computer device may be an LCD display or an e-ink display, and the input device of the computer device may be a touch layer overlaying the display, a button, a trackball, or a touchpad provided on the housing of the computer device, or an external keyboard, touchpad, or mouse.

It will be appreciated by one skilled in the art that the structure illustrated in FIG. 7 is only a block diagram of a portion of the structure related to the present disclosure, does not constitute a limitation on the computer device to which the present disclosure is applied, and the specific computer device may include more or fewer components than those shown in the figure, or combine certain components, or have a different arrangement of components.

In an embodiment, a computer device is provided, including a memory and a processor, a computer program is stored in the memory, and the processor is configured to execute the computer program to implement the following steps: determining, based on a preset compression ratio, to-be-compressed features and uncompressed features in a to-be-compressed embedding table of a recommendation model; generating a similarity index matrix based on a similarity between the to-be-compressed features and the uncompressed features; generating an index dictionary based on the similarity index matrix; substituting a first feature mapping dictionary based on the index dictionary to generate a second feature mapping dictionary, wherein the first feature mapping dictionary is generated based on a data set; and acquiring to-be-recommended data, replacing features in the to-be-recommended data according to the second feature mapping dictionary, inputting replaced features into the recommendation model, and outputting a prediction result.

In an embodiment, a computer-readable storage medium is provided, storing a computer program. The computer program is executed by a processor to implement the following steps: determining, based on a preset compression ratio, to-be-compressed features and uncompressed features in a to-be-compressed embedding table of a recommendation model; generating a similarity index matrix based on a similarity between the to-be-compressed features and the uncompressed features; generating an index dictionary based on the similarity index matrix; substituting a first feature mapping dictionary based on the index dictionary to generate a second feature mapping dictionary, wherein the first feature mapping dictionary is generated based on a data set; and acquiring to-be-recommended data, replacing features in the to-be-recommended data according to the second feature mapping dictionary, inputting replaced features into the recommendation model, and outputting a prediction result.

It should be noted that user information (including but not limited to user device information, user personal information, etc.) and data (including but not limited to data used for analysis, data stored, data displayed, etc.) involved in the present disclosure are those authorized by the user or sufficiently authorized by the parties.

One skilled in the art may understand that realizing all or part of the processes in the methods of the above-described embodiments is possible to be accomplished by a computer program that instructs the relevant hardware to do so, and the computer program may be stored in a non-volatile computer-readable storage medium. When the computer program is executed, a process such as the process of the embodiments of the respective methods described above may be included. Any reference to a memory, database, or other medium used in the embodiments provided in the present disclosure may include at least one of non-volatile and volatile memories. Non-volatile memories may include a Read-Only Memory (ROM), a magnetic tape, a floppy disk, a flash memory, an optical memory, a high-density embedded non-volatile memory, a resistive memory (Re-RAM), a magneto resistive Random Access Memory (MRAM), a Ferroelectric Random Access Memory (FRAM), a Phase Change Memory (PCM), a Graphene Memory, and so on. The volatile memory may include a Random Access Memory (RAM) or an external cache memory, and the like. As an illustration and not as a limitation, the RAM may be in various forms, such as a Static Random Access Memory (SRAM) or a Dynamic Random Access Memory (DRAM), and the like. The databases involved in the embodiments provided in the present disclosure may include at least one of a relational database and a non-relational database. The non-relational database may include a blockchain-based distributed database and the like, without limitation. The processor involved in the embodiments provided in the present disclosure may be a general-purpose processor, a central processing unit, a graphics processor, a digital signal processor, a programmable logician, a quantum computing-based data processing logician, and the like, without limitation.

The various technical features of the above-described embodiments may be combined in any combination, and for the sake of brevity of description, all possible combinations of the various technical features of the above-described embodiments have not been described. However, as long as the combinations of these technical features are not contradictory, they should be considered to be within the scope of the present specification as documented herein.

The above-described embodiments express only several embodiments of the present application, which are described in a more specific and detailed manner, but are not to be construed as a limitation of the scope of the patent of the present application. It should be pointed out that for one skilled in the art, several deformations and improvements can be made without departing from the conception of the present application, and these fall within the scope of protection of the present application. Therefore, the scope of protection of the present disclosure shall be subject to the attached claims.

What is claimed is:

1. An information recommendation method based on embedding table compression, comprising:
    determining, based on a preset compression ratio, to-be-compressed features and uncompressed features in a to-be-compressed embedding table of a recommendation model;
    generating a similarity index matrix based on a similarity between the to-be-compressed features and the uncompressed features;
    generating an index dictionary based on the similarity index matrix;
    substituting a first feature mapping dictionary based on the index dictionary to generate a second feature mapping dictionary, wherein the first feature mapping dictionary is generated based on a data set; and
    acquiring to-be-recommended data, replacing features in the to-be-recommended data according to the second feature mapping dictionary, inputting replaced features into the recommendation model, and outputting a prediction result;

after generating the second feature mapping dictionary, the method further comprises:

updating the recommendation model based on the second feature mapping dictionary, and acquiring a current model accuracy of the recommendation model;

acquiring an initial model accuracy of the recommendation model, and determining a change value of model accuracy of the recommendation model according to the initial model accuracy of the recommendation model and the current model accuracy of the recommendation model; and determining whether the change value of model accuracy of the recommendation model is not greater than a preset drop threshold of model accuracy of the recommendation model, if yes, saving the second feature mapping dictionary.

2. The method of claim 1, wherein the generating the similarity index matrix based on the similarity between the to-be-compressed features and the uncompressed features further comprises:

generating a similarity matrix based on the similarity between the to-be-compressed features and the uncompressed features;

determining an ordering of matrix element values of each row in the similarity matrix; and generating the similarity index matrix based on the ordering of matrix element values.

3. The method of claim 2, wherein the generating the similarity matrix based on the similarity between the to-be-compressed features and the uncompressed features further comprises:

acquiring first eigenvectors of the to-be-compressed features, second eigenvectors of the uncompressed features; and acquiring vector distances between the first eigenvectors and the second eigenvectors, determining similarities between the to-be-compressed features and the uncompressed features based on the vector distances, and generating the similarity matrix.

4. The method of claim 1, wherein when the change value of model accuracy is greater than the preset drop threshold of model accuracy, changing a compression ratio and reacquiring the second feature mapping dictionary until the change value of model accuracy of the recommendation model is not greater than the preset drop threshold of model accuracy of the recommendation model.

5. The method of claim 1, wherein the first feature mapping dictionary is generated based on a data set by:

acquiring the data set and counting attribute feature data of goods in the data set; and masking the attribute feature data in the data set to generate the first feature mapping dictionary.

6. The method of claim 5, wherein after generating the first feature mapping dictionary, the method further comprises:

determining a type of the recommendation model, dividing the data set after masking to obtain a training set, a validation set, and a test set; and training the recommendation model based on the training set and the validation set, and acquiring an initial model accuracy of the recommendation model based on the test set after the training is completed.

7. An information recommendation apparatus based on embedding table compression, comprising a memory and a processor, an acquiring module, a compression module, an index module, and a prediction module;

wherein the acquiring module is configured for determining to-be-compressed features and uncompressed features in a to-be-compressed embedding table of a recommendation model based on a preset compression ratio;

the compression module is configured for generating a similarity index matrix based on a similarity between the to-be-compressed features and the uncompressed features and generating an index dictionary based on the similarity index matrix;

the index module is configured for substituting a first feature mapping dictionary based on the index dictionary to generate a second feature mapping dictionary, wherein the first feature mapping dictionary is generated based on a data set; and the prediction module is configured for acquiring to-be-recommended data, replacing features in the to-be-recommended data according to the second feature mapping dictionary, inputting replaced features into the recommendation model, and outputting a prediction result;

the index module is further configured for updating the recommendation model based on the second feature mapping dictionary, and acquiring a current model accuracy of the recommendation model;

acquiring an initial model accuracy of the recommendation model, determining a change value of model accuracy of the recommendation model according to the initial model accuracy and the current model accuracy; and determining whether the change value of model accuracy is not greater than a preset drop threshold of model accuracy, if yes, saving the second feature mapping dictionary.

8. A computer device, comprising a memory and a processor, wherein a computer program is stored in the memory, and the processor is configured to execute the computer program to implement steps of the method of claim 1.

9. The computer device of claim 8, wherein the generating the similarity index matrix based on the similarity between the to-be-compressed features and the uncompressed features further comprises:

generating a similarity matrix based on the similarity between the to-be-compressed features and the uncompressed features;

determining an ordering of matrix element values of each row in the similarity matrix; and generating the similarity index matrix based on the ordering of matrix element values.

10. The computer device of claim 9, wherein the generating the similarity matrix based on the similarity between the to-be-compressed features and the uncompressed features further comprises:

acquiring first eigenvectors of the to-be-compressed features, second eigenvectors of the uncompressed features; and acquiring vector distances between the first eigenvectors and the second eigenvectors, determining similarities between the to-be-compressed features and the uncompressed features based on the vector distances, and generating the similarity matrix.

11. The computer device of claim 8, wherein when the change value of model accuracy is greater than the preset drop threshold of model accuracy, changing a compression ratio and reacquiring the second feature mapping dictionary until the change value of model accuracy of the recommendation model is not greater than the preset drop threshold of model accuracy of the recommendation model.

12. The computer device of claim 8, wherein the first feature mapping dictionary is generated based on a data set by:
   acquiring the data set and counting attribute feature data of goods in the data set; and
   masking the attribute feature data in the data set to generate the first feature mapping dictionary.

13. The computer device of claim 12, wherein after generating the first feature mapping dictionary, the method further comprises:
   determining a type of the recommendation model, dividing the data set after masking to obtain a training set, a validation set, and a test set; and
   training the recommendation model based on the training set and the validation set, and acquiring an initial model accuracy of the recommendation model based on the test set after the training is completed.

14. A computer-readable storage medium, storing a computer program, wherein the computer program is executed by a processor to implement steps of the method of claim 1.

15. The computer-readable storage medium of claim 14, wherein the generating the similarity index matrix based on the similarity between the to-be-compressed features and the uncompressed features further comprises:
   generating a similarity matrix based on the similarity between the to-be-compressed features and the uncompressed features;
   determining an ordering of matrix element values of each row in the similarity matrix; and
   generating the similarity index matrix based on the ordering of matrix element values.

16. The computer-readable storage medium of claim 15, wherein the generating the similarity matrix based on the similarity between the to-be-compressed features and the uncompressed features further comprises:
   acquiring first eigenvectors of the to-be-compressed features, second eigenvectors of the uncompressed features; and
   acquiring vector distances between the first eigenvectors and the second eigenvectors, determining similarities between the to-be-compressed features and the uncompressed features based on the vector distances, and generating the similarity matrix.

17. The computer-readable storage medium of claim 14, wherein when the change value of model accuracy is greater than the preset drop threshold of model accuracy, changing a compression ratio and reacquiring the second feature mapping dictionary until the change value of model accuracy of the recommendation model is not greater than the preset drop threshold of model accuracy of the recommendation model.

* * * * *